April 14, 1925.  
I. E. McGEE  
AGRICULTURAL IMPLEMENT  
Filed Dec. 26, 1923

1,533,878

I. E. McGee,  
Inventor

By *Clarence A. O'Brien*  
Attorney

Patented Apr. 14, 1925.

1,533,878

UNITED STATES PATENT OFFICE.

ISHAM E. McGEE, OF STARR, SOUTH CAROLINA.

AGRICULTURAL IMPLEMENT.

Application filed December 26, 1923. Serial No. 682,731.

*To all whom it may concern:*

Be it known that I, ISHAM E. MCGEE, a citizen of the United States, residing at Starr, in the county of Anderson and State of South Carolina, have invented certain new and useful Improvements in Agricultural Implements, of which the following is a specification.

This invention relates to agricultural implements and has particular reference to an improved form of earth working implements.

A specific object of the invention is to provide an implement of the above kind having an improved form of colter mounting and adjusting means whereby a plurality of colters may operate in advance of a plow share for cutting the earth in an effective manner so as to permit the plow share to pass through the soil with a minimum amount of resistance, and whereby the furrows are turned with the formation of a minimum amount of clods.

Still another object of the invention is to provide colter disc mounting means of improved form and by means of which the colter discs are allowed to yield vertically so as to pass over obstructions encountered, such as stones and the like embedded in the ground.

Still another object of the invention is to provide means for adjusting the colter discs to different angles relative to the line of movement of the implement so that the colter discs may operate to best advantages and the particular conditions met with.

Other objects will appear as the nature of the invention is better understood and the same consists in the novel form, combination and arrangement of parts hereinafter more fully described, shown in the accompanying drawing and claimed.

In the drawing, wherein like reference characters indicate corresponding parts throughout the several views.

Figure 1:
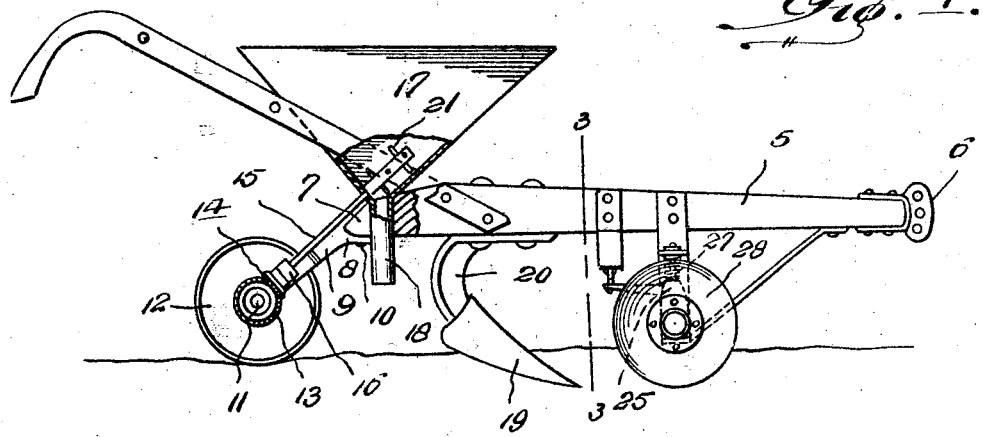
Figure 1 is a view, partly in side elevation and partly in vertical section of an agricultural implement constructed in accordance with the present invention.

Referring more in detail to the drawings, the present disclosure embodies a beam 5 having a conventional form of clevis 6 rigidly secured to the forward end thereof for facilitating connection of the beam with a tractor or draft animal, whereby the implement may be drawn over the field. The rear end of the beam 5 is tapered at 7 by bevelling the same or the like, so as to fit within the bifurcated upper end portion 8 or a standard 9, such bifurcated portion of the standard being bolted to the beam as indicated at 10, whereby the standard 9 is rigidly fixed in a rearwardly inclined position as shown in Figure 1. Journalled in the lower end of the standard 9 is a transverse horizontal shaft 11 that projects beyond opposite sides of the standard 9 and has a ground engaging wheel 12 fixed on one end thereof and a bevelled gear 13 fixed on the other end thereof. The bevelled gear 13 meshes with a bevelled pinion 14 that is secured upon the lower end of an inclined shaft 15 journalled in a bearing 16 carried by the standard 9 and in a wall of a hopper 17 upon the rear end of the beam 5. The hopper 17 is provided with a bottom discharge spout 18 that extends through an opening in the beam 5 rearwardly of the plow share 19 that is rigidly carried by a standard 20 fixed to the beam 5 forwardly of the spout 18. The upper end of the shaft 15 terminates within the hopper 17 and is provided with a suitable agitator embodying radial pins 21 by means of which the seeds may be agitated to continue to discharge through the spout 18 upon forward movement of the implement. The usual handles 22 are attached to the beam 5 and project rearwardly and upwardly therefrom in convenient position to be grasped by the attendant or operator for guiding the implement when in use. These details do not enter into the novelty claimed in the present invention. The specific novelty claimed, resides in the following details and their arrangement.

Figure 2:
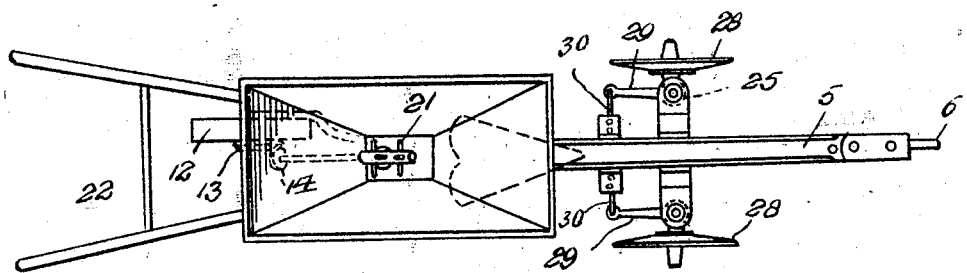
Figure 2 is a top plan view of the device shown in Figure 1.

Fixed to and depending from opposite sides of the beam 5 forwardly of the plow share 19 are a pair of outwardly facing vertical fork members 23 in the arms of which are secured vertical spindles 24 upon which are rotatably and slidably mounted the hub members 25 of stub axles 26. The stub axles 26 project outwardly in opposite directions and disposed about the bolts or spindles 24 above the hub members 25 are compression springs 27 that normally act to yieldingly hold the hub members 25 of the stub axles 26 in lowermost position on the spindles 24. Colter discs 28 of any well known or preferred form are journalled upon the stub axles 25 so as to be positioned in transverse alignment at opposite sides of the beam 5 as shown in Figure 2.

Figure 3:
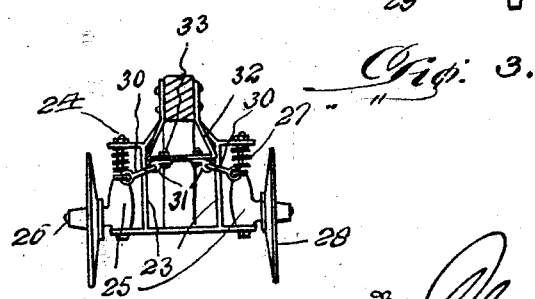
Figure 3 is a vertical sectional view taken substantially upon the line 3—3 of Figure 1.

Rigid with the upper portions of the stub axle hubs 25 are rearwardly projecting horizontal arms 29 to the rear ends of which are pivoted inwardly extending links 30, the inner ends of which are pivoted to apertured plates 31 as shown more clearly in Figure 3. Fixed to the beam 5 rearwardly of the colter discs and forwardly of the standard 20 is a standard U-shaped depending bracket 32, the central portion of which is provided with a longitudinal series of apertures and is horizontally disposed directly beneath the beam 5 in transverse alignment with the links 30. The apertured plates 31 are disposed against the under surface of the horizontal portion of the brackets 32 and held to the latter by means of bolts 33 passing through the plates 31 and desired ones of the openings in the brackets 32. Obviously, by adjusting the bolt 33 to different ones of the openings in the brackets 32, the angle at which the colter discs 28 are set relative to the line of movement of the implement may be varied.

At the same time, the colter discs and their stub axles may yield vertically at all times as permitted by the springs 27 disposed above the hub members 25, for permitting such colter discs to ride over obstructions embedded in the ground. Roller or ball bearings are preferably employed between the hubs of the discs 28 and the stub axles 26.

When it is desired to simply use the implement for plowing purposes, no seed is placed in the hopper 17, and upon forward movement of the implement, the discs 28 will be rotated by rolling contact with the soil so as to score the same and thereby enable the plow share to easily turn the furrow as said colters operate in advance of the plow share, the angular relation of the colters 28 being previously adjusted as found most desirable relative to the longitudinal axis of the beam 5. When the colters or either one of the same encounter a stone or the like, such coulters will yield upwardly as allowed by the spring 27 and damage to the colter will thereby be prevented. If desired, the furrow formed by the plow share 19 may have seed deposited therein as the plowing operation proceeds by simply placing a supply of the seed within the hopper 17. When this is done, the contact of the wheel 12 with the ground causes rotation so as to rotate the shaft 15 through the gearing described and thereby cause the pins 21 to agitate the seed within the hopper 17 for insuring their continuous discharge through the spout 18 behind the plow share and in line with the furrow formed by the latter.

From the foregoing description, it is believed that the construction and operation, as well as the advantages of the present invention will be readily understood and appreciated by those skilled in the art.

What I claim as new is:

1. In an agricultural implement of the character described, a beam, vertical bifurcated members rigidly attached to and depending from opposite sides of the beam, vertical spindles carried by said bifurcated members, outwardly projecting stub axles having hub members upon the inner ends thereof rotatably and slidably mounted upon said spindles, yieldable means carried by said spindles for resisting sliding movement of the stub axle hubs upwardly on said spindles, means associated with the stub axles and with the plow beams for securing the stub axles in adjusted position at different angles relative to the longitudinal axis of the beam, and coulter discs journalled upon said stub axles.

2. In an agricultural implement of the character described, a beam, vertical bifurcated members rigidly attached to and depending from opposite sides of the beam, vertical spindles carried by said bifurcated members, outwardly projecting stub axles having hub members upon the inner ends thereof rotatably and slidably mounted upon said spindles, yieldable means carried by said spindles for resisting sliding movement of the stub axle hubs upwardly on said spindles, means associated with the stub axles and with the plow beams for securing the stub axles in adjusted position at different angles relative to the longitudinal axis of the beam, colter discs journalled upon said stub axles, said last named means comprising rearwardly projecting arms rigid with the upper ends of the stub axle hub and having inwardly extending links pivoted to the rear ends thereof, a bracket rigid with the beam rearwardly of the stub axle having a horizontal portion provided with a longitudinal series of openings and disposed transversely beneath the beam, and apertured plates carried by the inner ends of said links and adapted to be selectively bolted at different positions relative to said bracket.

In testimony whereof I affix my signature

ISHAM E. McGEE.